Jan. 12, 1971     R. M. DAWSON     3,554,570

COMBINATION BABY WALKER

Filed Oct. 3, 1968

INVENTOR
ROBERT M. DAWSON

United States Patent Office 3,554,570
Patented Jan. 12, 1971

3,554,570
COMBINATION BABY WALKER
Robert M. Dawson, 2109 W. 17th, Pueblo, Colo. 81003
Filed Oct. 3, 1968, Ser. No. 765,747
Int. Cl. B62b 7/14
U.S. Cl. 280—7.1                1 Claim

ABSTRACT OF THE DISCLOSURE

A baby walker which is adaptable for other uses after a baby has outgrown its use as a walker, the device including a removable seat and a horse head whereby the device then comprises a platform upon rollers and which can be used as a skate board or other vehicle for use by a growing child.

---

This invention relates generally to baby walkers.

A principal object of this invention is to provide an improved baby walker which is adapted to be readily converted into a skate board or other vehicle after the baby has outgrown use of the walker.

Another object of the present invention is to provide a combination baby walker which includes a seat and a horse head, each of which is selectively removable so as to convert the baby walker to a skate board or other vehicle.

Yet another object of the present invention is to provide a combination baby walker wherein the seat and horse head may be readily and easily replaced if desired for using the device again as a baby walker.

Other objects of the present invention are to provide a combination baby walker which is simple in design, inexpensive to manufacture, rugged in construction, easy to use and efficient in operation.

These and other objects will be readily evident upon a study of the following specificatiton together with the accompanying drawing wherein.

Figure 1:
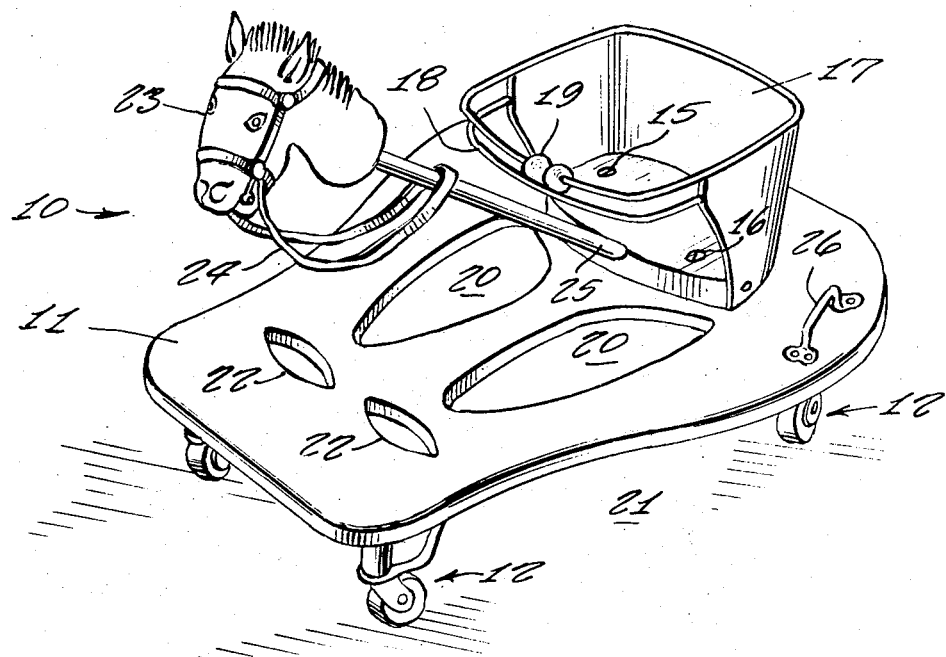
FIG. 1 is a perspective view of the present invention.
Figure 2:
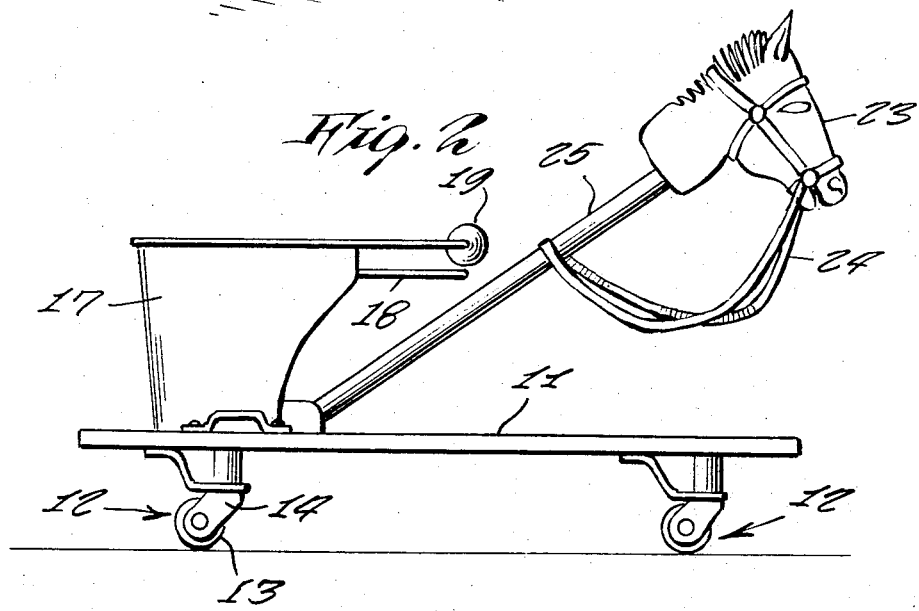
FIG. 2 is a side elevation view thereof.

Referring now to the drawing in detail, the reference numeral 10 represents a combination baby walker according to the present invention wherein there is a flat platform 11 which is supported upon a plurality of casters 12 each of which includes a rotatable wheel 13 mounted within a swiveling bracket 14. As shown in the drawing, there are a pair of front casters and a pair of rear casters.

The platform 11 has a seat 15 mounted thereupon by means of removable bolts 16, the seat having an integral back rest 17 which is provided with an integral front safety band 18 to prevent a child from falling off. The combination baby walker has attractively colored beads 19 mounted upon the protective bar 18 so as to amuse the infant seated upon the walker.

A pair of openings 20 are provided through the platform 11 immediately in front of the seat 15 through which a child may place his legs so as to be able to place his feet upon the floor 21 in order to push the vehicle. A pair of other openings 22 are provided immediately in front thereof for the purpose of allowing manual grasp of the device by an attendant or for securement of a cord thereto so as to allow the baby walker to be pulled.

A decorative horse head 23 having reins 24 secured thereto is mounted upon one end of a post 25 which at its opposite end is fitted into an opening made along a forward edge of the seat 15 for allowing the horse head to extend diagonally upwardly therefrom.

In operative use, the child may seat himself upon the seat 15 and with his feet through openings 20 have access to push himself and the vehicle along the floor 21. The child may grasp the reins 24 thereby giving the illusion of steering a horse. When the child has outgrown the conventional use of a baby walker, the seat 15 and the horse head assembly are readily removable whereby allowing the platform to be used as a skate board or as a flat surfaced vehicle for a growing child. A pair of handle bars 26 are mounted upon the upper side of the platform 11 so as to serve as convenient handles when the device is used as a wheeled sled or the equivalent.

I claim:
1. A vehicle comprising:
   a flat platform having a first pair of substantially centrally located apertures and having a second pair of apertures located forwardly of said platform;
   a plurality of wheels mounted on said platform and adapted to support said platform;
   seating means detachably mounted on the top of said platform rearwardly of said first pair of apertures, said seating means comprising a bottom seat portion, upstanding side and rear wall portions and an encircling guard rail attached to the side wall portions and extending forwardly thereof;
   handle means fastened to the top of said platform laterally of said seating means; and
   decorative animal symbol carried by said seating means and removable therewith.

References Cited

UNITED STATES PATENTS

| 1,432,612 | 10/1922 | O'Connor | 280—87.02(W) |
| 1,572,273 | 2/1926 | Elton | 280—87.02(W) |
| 1,814,230 | 7/1931 | Sperry | 280—87.03 |
| 2,988,370 | 6/1961 | Bertram | 280—87.02 |
| 3,319,970 | 5/1967 | Sherman | 280—1.13 |

FOREIGN PATENTS

| 113,661 | 3/1918 | Great Britain | 280—87.02W |
| 248,210 | 3/1926 | Great Britain | 280—1.22 |

LEO FRIAGLIA, Primary Examiner

U.S. Cl. X.R.

280—87.02